United States Patent
Gettleman et al.

(10) Patent No.: US 6,181,946 B1
(45) Date of Patent: Jan. 30, 2001

(54) METHOD FOR SUBSCRIBER BASED MANAGEMENT OF NEIGHBOR LIST INFORMATION DURING A COMMUNICATION SESSION

(75) Inventors: Eric W. Gettleman, Tampa; Anil N. Patel, Boca Raton; Todd M. Russell, Plantation, all of FL (US)

(73) Assignee: Motorola, Inc., Schaumburg, IL (US)

( * ) Notice: Under 35 U.S.C. 154(b), the term of this patent shall be extended for 0 days.

(21) Appl. No.: 08/919,515

(22) Filed: Aug. 28, 1997

(51) Int. Cl.[7] ............................................. H04B 7/00
(52) U.S. Cl. ............................ 455/509; 455/517; 455/513
(58) Field of Search ................................. 455/432, 434, 455/435, 436, 437, 438, 439, 440, 509, 512

(56) References Cited

U.S. PATENT DOCUMENTS

| | | |
|---|---|---|
| 5,103,306 | 4/1992 | Weiman et al. .................. 358/133 |
| 5,222,248 | 6/1993 | McDonald et al. ............... 455/33.2 |
| 5,260,943 | 11/1993 | Comroe et al. .................. 370/95.1 |
| 5,276,906 | 1/1994 | Felix ................................ 455/33.2 |
| 5,327,575 * | 7/1994 | Menich et al. .................... 455/440 |
| 5,499,386 * | 3/1996 | Karlsson .......................... 455/33.2 |
| 5,586,338 * | 12/1996 | Lynch et al. ..................... 455/34.1 |
| 5,649,291 | 7/1997 | Tayloe ............................... 370/332 |
| 5,649,303 * | 7/1997 | Hess et al. ........................ 455/443 |
| 5,854,981 * | 12/1998 | Wallstedt et al. ................. 455/439 |

* cited by examiner

Primary Examiner—Thanh Congle
Assistant Examiner—Darnell R. Armstrong
(74) Attorney, Agent, or Firm—Andrew S. Fuller

(57) ABSTRACT

A subscriber (410) to a radio communication system manages information needed to monitor for potential server sites during an ongoing communication session. Upon switching server sites during an ongoing communication (520, 530, 540, 550), the subscriber uses a modified neighbor site list for subsequent monitoring for potential server sites (570). The modified list is generated from the original list without benefit of new information downloaded from an external source, by replacing information representing the new server site with information representing the old server site (560).

11 Claims, 5 Drawing Sheets

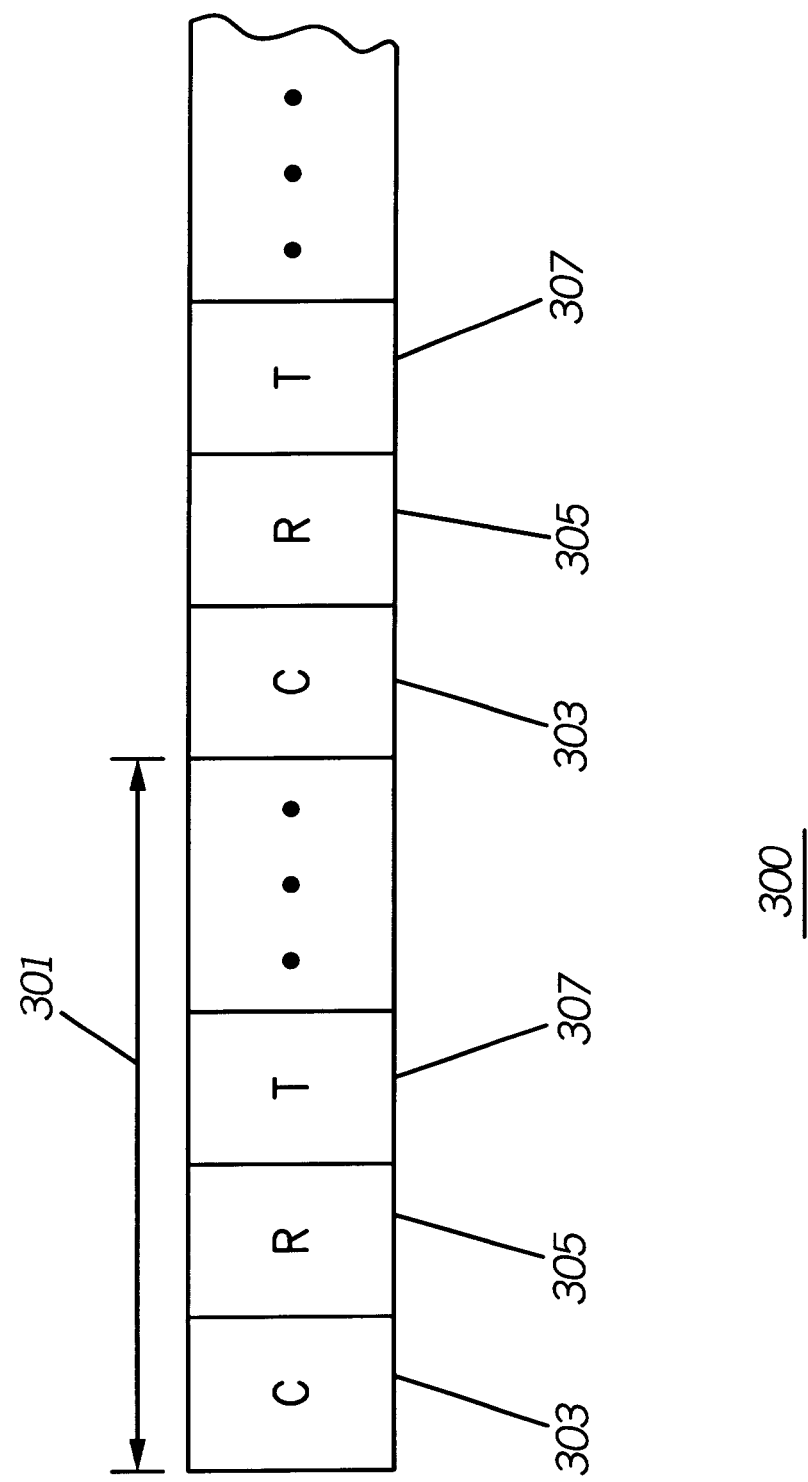

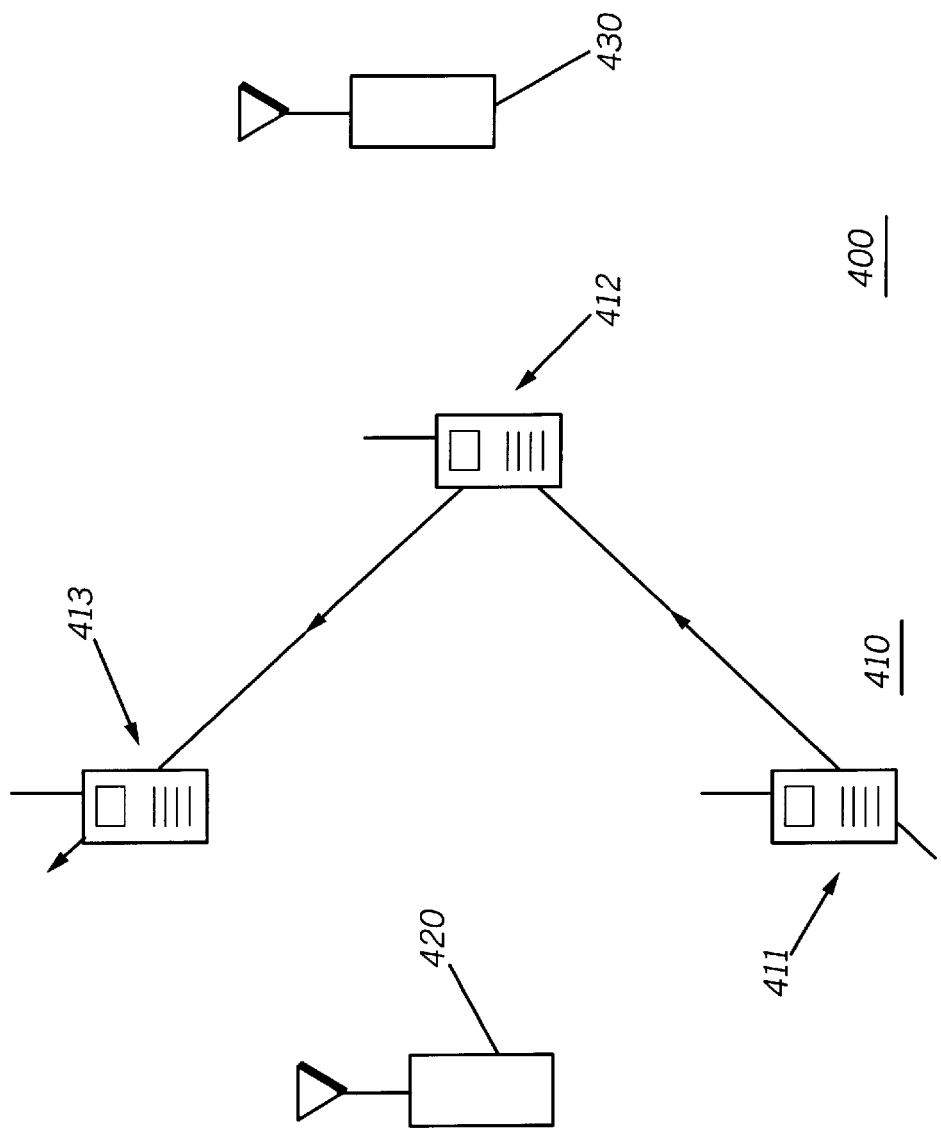

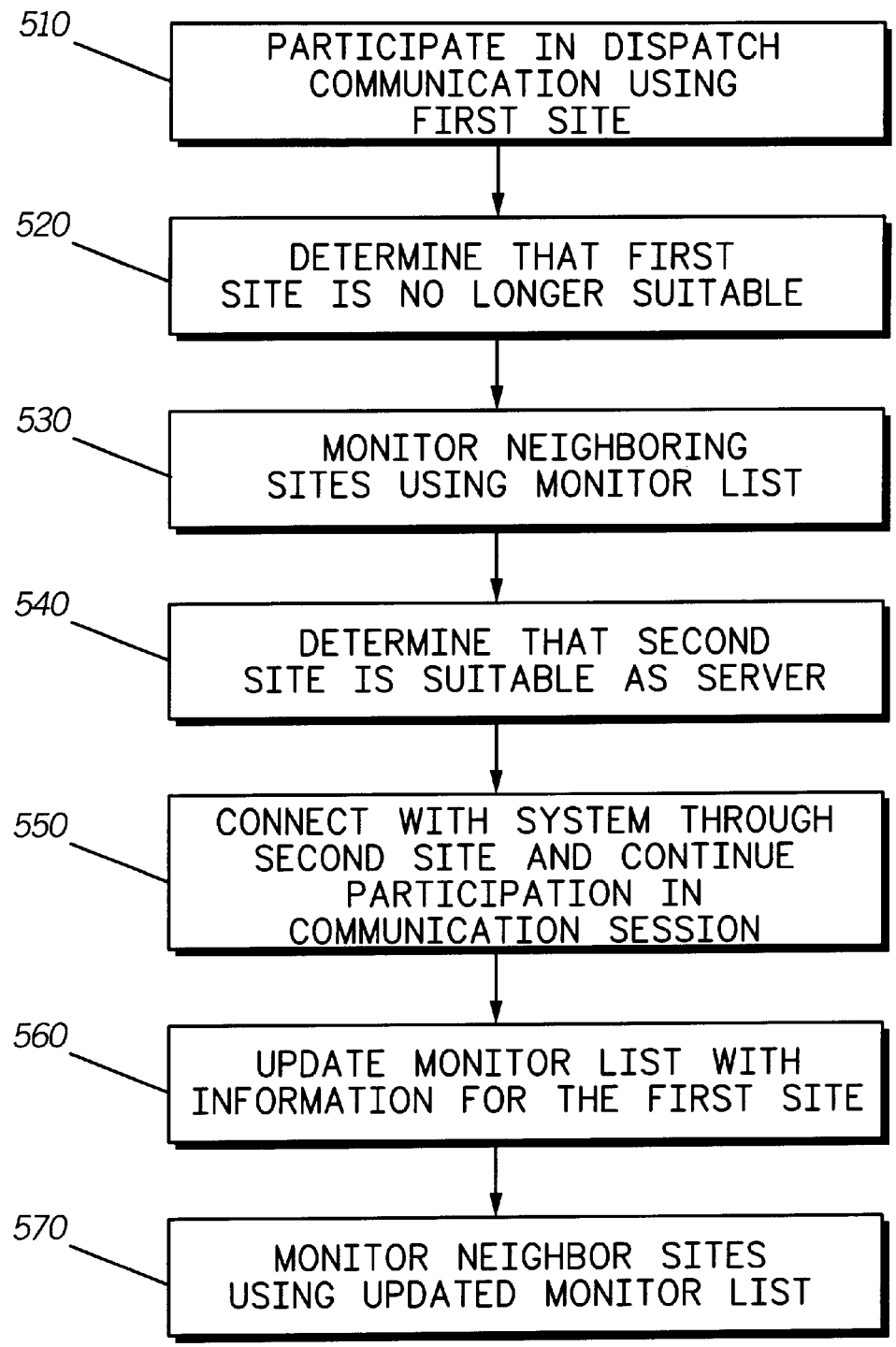

METHOD FOR SUBSCRIBER BASED MANAGEMENT OF NEIGHBOR LIST INFORMATION DURING A COMMUNICATION SESSION

TECHNICAL FIELD

This invention relates in general to radio communication systems, and more particularly, to the management of neighbor list information during a communication session.

BACKGROUND

Geographically dispersed transceiver sites are often employed in two-way radio communication systems to support subscribers operating over a wide coverage area. Ordinarily, the sites are arranged such that each provides coverage for a particular geographic region, which may have some overlap. A subscriber interfaces with the radio communication system through a particular transceiver site, referred to herein as a server site. When a subscriber moves from one location to another, it may be advantageous to switch server operations from one site to another, such as a neighboring site, in order to maintain a high quality communication link. The process of switching server sites during an ongoing communication session is generally referred to in the art as hand-off or hand-over. The hand-off decision process usually involves a determination of the quality of signals received by the subscriber from its server site, or vice versa, and the availability and suitability of other potential server sites that may be in communication range of the subscriber. The hand-off decision may be made using information gathered by the server site, information gathered by the subscriber, or a combination of both.

In one prior art example, a subscriber maintains a list of control frequencies used by neighboring sites, and monitors the signal quality and/or other communication parameters for signals emanating from these sites. The information gathered by the subscriber is then used to select a suitable hand-off server site. The list of frequencies representing neighboring sites is referred to herein as a monitor list. The monitor list may be preprogrammed into the subscriber or downloaded from the system. A prior art hand-off process is described in U.S. Pat. No. 5,260,943, issued to Comroe et al., on Nov. 9, 1993, for a TDM Hand-off Technique Using Time Differences, the entire contents of which are hereby incorporated by reference. Here, a subscriber receives a monitor list from a site with which it is communicating satisfactorily. This monitor list is used to determine potential server sites for use when a hand-off becomes necessary.

A problem may arise when a subscriber is engaged in an ongoing communication session and performs a hand-off process, thereby switching to a new server site. Potentially, the monitor list could become outdated such the subscriber is unable to switch to an appropriate server site that is not on the list. For example, consider a subscriber that performs a hand-off because of a temporary radio frequency (RF) interference or obstruction, Esuch as from a passing vehicle or from a building or bridge. Until the monitor list is updated, the subscriber may be unable to revert to the old server site that was previously providing system services, as the old server site was not in its monitor list. Such an occurrence is a commonly encountered problem in some prior art systems. Oftentimes, priority is given to utilizing available communication resources to maintain the ongoing communication session without interruption. Thus, the system may be unable to provide new monitor list in a timely manner. The problem becomes more acute when the subscriber is engaged in a group dispatch call along with several other subscribers, and much coordination is needed to provide new monitor list information without losing any of the ongoing communication.

It is desirable to provide a system in which a subscriber is provided with adequate monitor list information to determine potential server sites while participating in an ongoing communication session. Preferably, such information is provided with minimal impact on the ongoing communication session.

BRIEF DESCRIPTION OF THE DRAWINGS

FIG. 3 is a block representation of a time division multiplexing protocol frame, in accordance with the present invention.

FIG. 4 illustrates potential server site choices for a subscriber unit traveling along a path between two sites, in accordance with the present invention.

FIG. 5 is a summary of procedures used by a subscriber unit to monitor for potential server sites while participating in an ongoing communication session, in accordance with the present invention.

DETAILED DESCRIPTION OF THE PREFERRED EMBODIMENT

The present invention provides for subscriber based management of information needed to monitor for potential server sites during an ongoing communication session. Particularly, upon switching server sites during an ongoing communication, the subscriber unit modifies a neighbor site monitor list to include information on the previous server site, without benefit of new information downloaded from an external source. Preferably, the subscriber unit determines that its current server site is no longer desirable to support its ongoing communication. The subscriber unit selects a suitable server site based on the monitoring of neighboring sites according to an available monitor list, and modifies the monitor list by replacing information representing the selected server site with information representing the current server site. The subscriber unit establishes a communication link through the selected server site to maintain its ongoing communication session.

Figure 1:
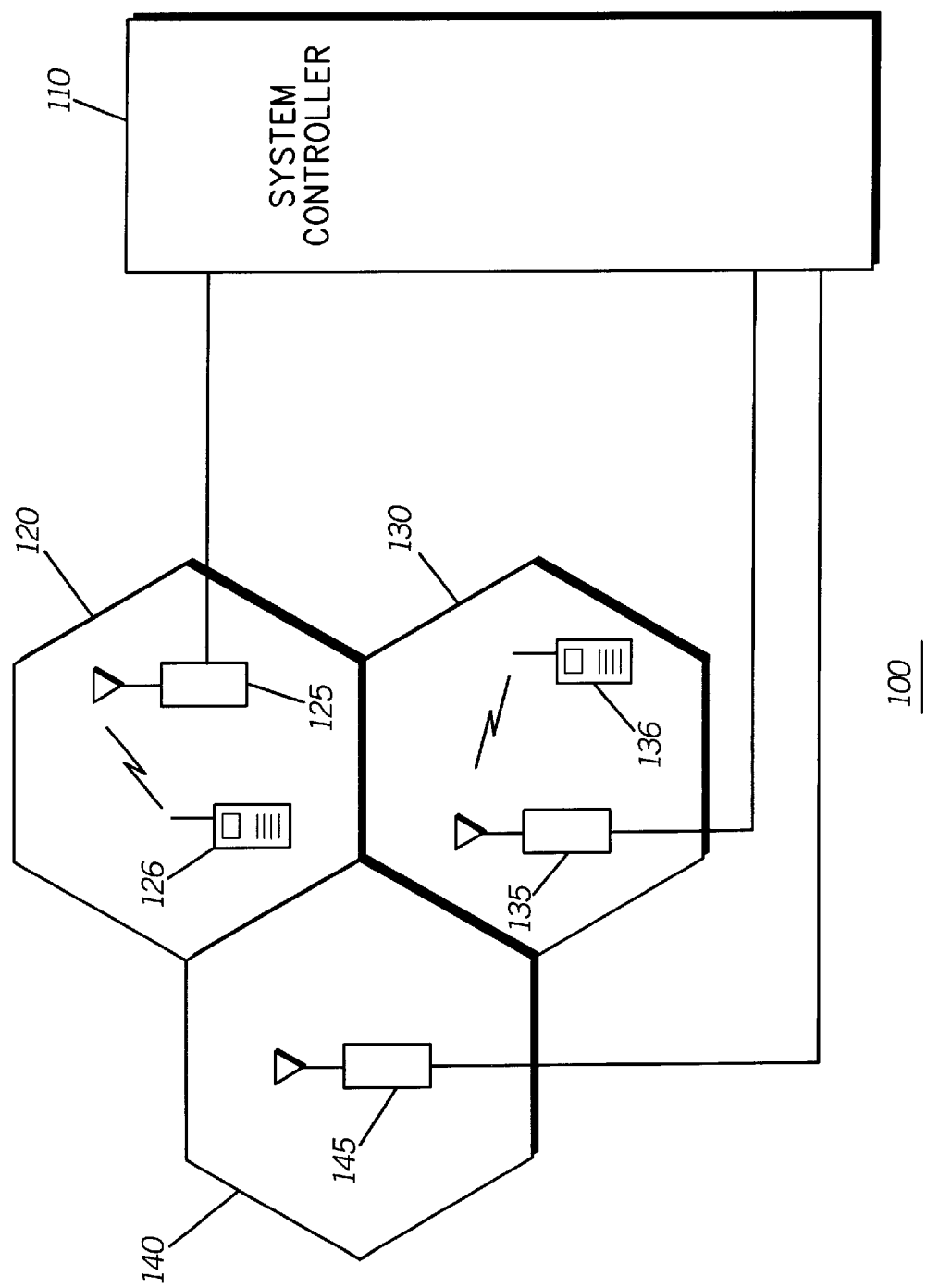
FIG. 1 is a representation of a radio communication system operating in accordance with the present invention.

FIG. 1 shows a block diagram of a radio communication system 100, operating in accordance with the present invention. In the preferred embodiment, the communication system 100 provides a radio network infrastructure that supports telephone, dispatch, data, and other communication services over a wireless network. Wireless communications occur over the network using a time division multiplexed (TDM) protocol, which is described in more detail below.

The system 100 includes a system controller site 110, coupled communication cell sites 125, 135, 145, and subscriber units 126, 136. The controller 110 includes computational and communication equipment that implement management functions for the radio communication system 100. For example, the controller 110 manages and coordinates communication access to and from each subscriber unit 126, 136 through the sites 125, 135, 145, and allocates communication resources at each site. Additionally, the controller 110 coordinates communication between participants of the communication system and entities (not shown) external to the system 100, such as to a public switched telephone network, and the like. The system 100 has a coverage area that includes separate coverage regions 120, 130, 140, which typically overlap (overlapping not shown). Each coverage region is supported by one of the cell sites 125, 135, 145. The cell sites 125, 135, 145 preferably comprise radio transceivers that function as base stations. The cell sites 125, 135, 145 are configured to support subscriber communication within their respective coverage regions.

The subscriber units 126, 136 are two-way wireless devices, such as portable or mobile two-way radio transceivers, or other electronic device with a wireless communication portion. Generally, a subscriber unit operates within the radio system 100 through an affiliated site using communication resources, such as wireless frequencies, allocated for use by that site. The affiliated site is referred to herein as a server site or server cell site. Oftentimes, a subscriber unit moves from the coverage area of a first site into the coverage area of a second site. To maintain a communication link, site affiliation is transferred from the first site to the second site. This process is known as hand-over or hand-off. Hand-off protocols for TDM systems are known in the art as is exemplified in U.S. Pat. No. 5,159,593, issued to D'Amico, et al on Oct. 27, 1992 for Channel Acquisition and Hand-Off Method and Apparatus for a TDMA Communication System. Usually, the communication system is formed such that the coverage area of one site partially overlaps the coverage area of another site. Thus, at a given location and time, there may be two or more sites which could function as a server site for the subscriber unit. Generally, a mechanism using factors such as received signal strength, signal reception quality, user preference, and other such parameters, are combined in an algorithm to determine which site to use. According to the present invention the subscriber unit maintains a list (referred to herein as a "monitor list" or "neighbor cell list") that contains information needed for monitoring neighboring sites to determine potential server sites.

Figure 2:
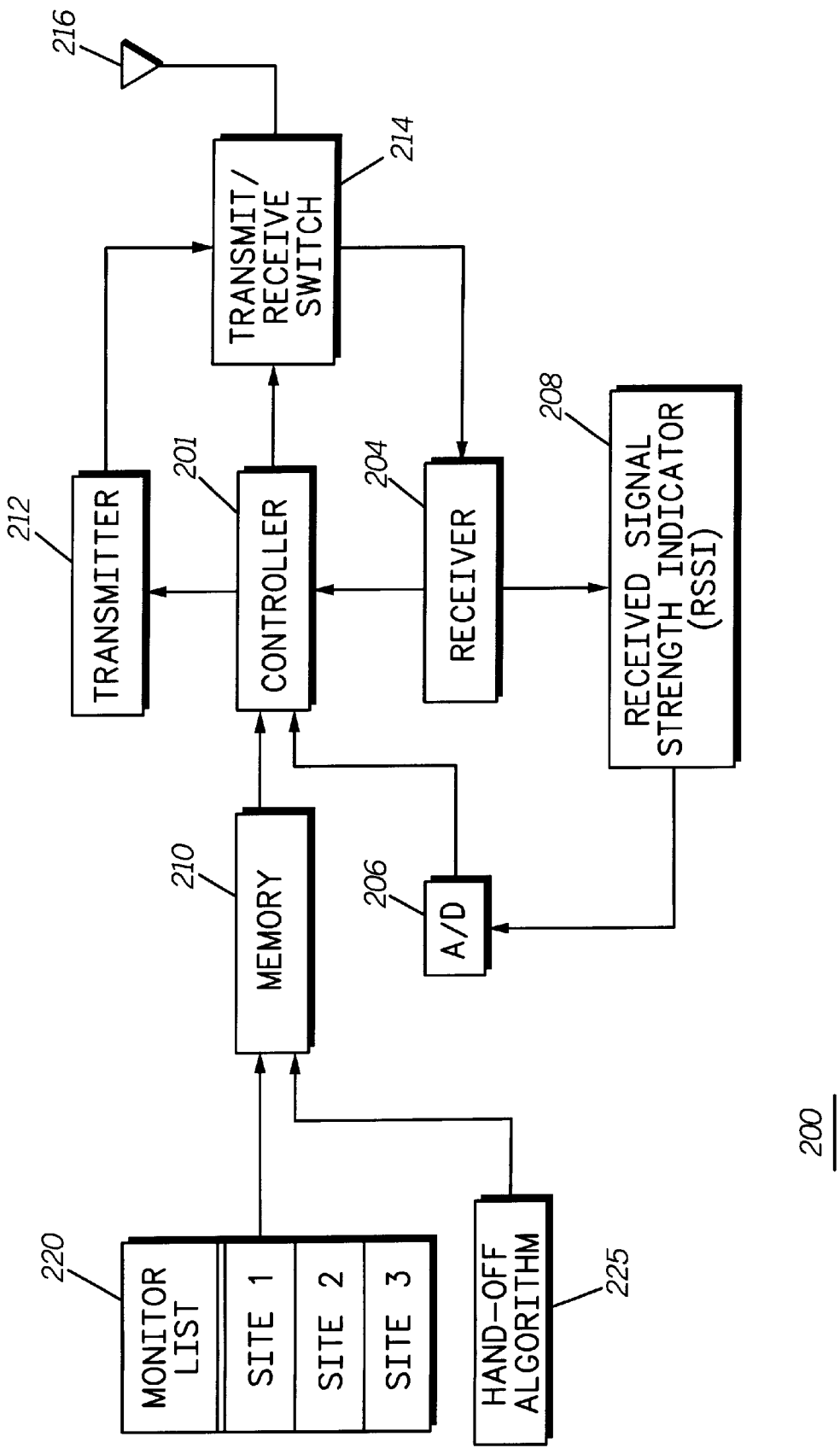
FIG. 2 is a block diagram of a subscriber unit, in accordance with the present invention.

FIG. 2 is a block diagram of a subscriber unit 200, in accordance with the present invention. The subscriber units 126, 136 of FIG. 1 are of similar construction. A controller 201 provides operational control for the subscriber unit 200 by executing well-known instructions which are stored in a coupled memory 210. The memory 210 also stores a monitor list 220, that contains a set of communication channels, frequencies, or other communication resources, to be monitored by the subscriber unit 200, in order to determine a potential server site. The monitor 220 list may be preprogrammed into the subscriber unit 200, or the list may be downloaded from a server site in an over-the-air transmission.

The subscriber unit 200 selectively receives signals through an antenna 216 which is coupled to a transmit/receive (T/R) switch 214. When receiving, the T/R switch 214 is under the control of the controller 201 which effects the coupling of the antenna 216 to a receiver 204. The receiver 204 decodes the received signals and presents those signals to the controller 201 for processing. A transmitter 212 is operably coupled to the controller 201. For transmit operations, the T/R switch 214 is positioned so that the transmitter 212 can operate through the antenna 216.

The subscriber unit 200 operates to monitor the list of communication channels to detect signals transmitted by neighboring sites, i.e., sites, other than its server site, that are within communication range of the subscriber unit 200. The controller 201 receives a received signal strength indicator (RSSI) signal from a RSSI circuit 208. The RSSI is related to the strength of the received signal, and its noise characteristics. The RSSI circuit 208 uses an analog to digital converter 206 to present a digital RSSI to the controller 201. Using the RSSI signal, the controller 201 determines information regarding the proximity of the site to the subscriber unit 200. Preferably, the communication channels monitored correspond to control channels on which information pertaining to the identification and characteristics of the site is transmitted. The information collected is used to rank each site according to its suitability as a potential server site. The subscriber unit 200 operates to switch server sites as needed using a hand-off algorithm 225 stored in memory 210.

As mentioned earlier, the system operates using a TDM protocol. Under the TDM protocol, a communication resource, such as a wireless carrier frequency, is divided into time frames, and the frames are subdivided into time slots. FIG. 3 shows a block representation 300 of such a TDM frame. In this particular TDM frame 301, the first time slot 303 is designated as a control slot in which resource management information is communicated. In a typical implementation, there is frequent communication activity on the control slot 303. Communication on the control slot includes resource allocation and management information, identification information, and the like. Other slots 305, 307 are designated as transmit and receive slots. In some implementations, transmit and receive slots are implemented in separate frames. Several communication units may share a frame, each with its designated slot for transmit or receive operations. With this arrangement, a subscriber unit may be engaged in communications with another subscriber unit or other communicant during its transmit and receive slots, but generally has time between receive and transmit operations (dead time), and during periods of communication inactivity for monitoring and other purposes. According to the present invention, the subscriber unit uses available time to monitor for potential server sites, and to perform unassisted update of its monitor list as needed.

FIG. 4 shows a communication environment 400 having a subscriber unit 410 operating along a path that traverses between two server sites 420, 430, in accordance with the present invention. FIG. 5 is a summary of procedures 500 used by the subscriber unit 410 to manage neighbor cell list information during an ongoing communication session, in accordance with the present invention. Referring to FIG. 4 and FIG. 5, at position 411, the subscriber unit 410 participates in an ongoing communication session using a first server site 420, step 510. In the preferred embodiment, the ongoing communication session corresponds to a group call dispatch communication. The group call involves a communicating group comprising several subscriber units operating through multiple server sites. At position 412, the subscriber unit determines that the first server site is no longer desirable or preferred for supporting the ongoing communication session, step 520. For example, the signal strength for signals communicated from the first server site, as indicated by a RSSI value, may have fallen below a particular threshold. Preferably, the subscriber unit monitors neighboring sites, based on its current and available neighbor cell list, to determine suitable server sites, step 530. The subscriber unit determines that a second site 430 is suitable as a server site, step 540, and selects that site as its server site.

The subscriber unit connects with the system through the second site 430, and continues participation in the ongoing communication session, step 550. In the preferred embodiment, the subscriber unit initiates communication with the second site 430, and obtains therefrom a communication or traffic channel assignment. Preferably, the subscriber unit cooperates with the second site 430 to establish a communication link in an expeditious manner, such that the ongoing communication session is maintained with minimum loss of participation.

According to the present invention, upon switching to a new server site, the subscriber unit generates a modified neighbor cell list by updating the existing neighbor cell list with information about the old server site. After switching server sites at position 412, the subscriber unit updates its current neighbor cell list with information corresponding to the previous server site 420 to generate an updated neighbor cell list, step 560. The neighbor cell list is modified without benefit of new neighbor cell information downloaded from an external source. Preferably, the previous server site 420 occupies a top priority position on the neighbor cell list. Subsequent monitoring of neighbor sites for potential server sites is performed using the modified neighbor cell list, step 570. At position 413, the subscriber unit determines that the first site 420 is preferred when compared to the second site, and reverts to the first site as its server site.

By using the modified neighbor cell list, the previous server site becomes one of the neighbor sites monitored for potential use as a server site. Thus, a subscriber unit that performs a hand-off because of a temporary radio frequency (RF) interference or obstruction, such as from a passing vehicle or from a building or bridge, may quickly revert to the old server site that was previously providing system services, even though no new monitor list information is acquired from external sources. This problem, commonly encountered in some prior art systems, is addressed by the present invention.

What is claimed is:

1. In a radio communication system having a first server cell site, and a subscriber unit engaged in a dispatch communication supported by the first server cell site, a method at the subscriber unit, comprising the steps of:

determining that the first server cell site is no longer desirable for supporting the dispatch communication;

selecting a second server cell site from a current neighbor cell list stored at the subscriber unit;

generating a modified neighbor cell list from the current neighbor cell list by substituting the first server cell site for the second server cell site;

continuing the dispatch communication through the second server cell site; and monitoring for potential server cell sites using the modified neighbor cell list.

2. The method of claim 1, wherein the step of generating comprises the step of placing the first server cell site in a priority position on the modified neighbor cell list.

3. The method of claim 2, wherein the step of generating comprises the step of placing the first server cell site in a top priority position on the modified neighbor cell list.

4. The method of claim 1, wherein the step of generating comprises the step of modifying the current neighbor cell list without benefit of new neighbor cell information downloaded from an external source.

5. The method of claim 1, wherein the step of continuing the dispatch communication comprises the steps of:

initiating communication with the second server cell site; and obtaining a communication channel assignment from the second server cell site.

6. In a radio communication system having a first server cell site, and a subscriber unit engaged in communication supported by the first server cell site, a method at the subscriber unit, comprising the steps of:

determining that the first server cell site is not preferred for maintaining the communication;

selecting a second server cell site based on a cell site monitor list available at the subscriber unit;

establishing a communication link through the second server cell site to maintain the communication;

updating the cell site monitor list with information corresponding to the first server cell site to generate an updated cell site monitor list, without benefit of new neighbor cell site information downloaded from an external source; and monitoring neighbor cell sites to determine suitable server cell sites using the updated cell site monitor list.

7. The method of claim 6, wherein the step of updating comprises the step of placing the first server cell site in a priority position on the cell site monitor list.

8. The method of claim 6, wherein the step of updating comprises the step of removing the second server cell site from the cell site monitor list.

9. The method of claim 6, wherein the step of establishing a communication link comprises the steps of:

initiating communication with the second server cell site; and obtaining a traffic channel assignment from the second server cell site.

10. In a radio communication system having a system site coupled to a first cell site, and a communicating group, including a subscriber unit, engaged in dispatch communication supported by the system site, a method at the subscriber unit, comprising the steps of:

participating in the dispatch communication using the first cell site as a server site; determining that the first cell site is no longer suitable as the server site; monitoring neighbor cell sites, using a cell site monitor list, to determine suitable server sites;

determining that a second cell site is suitable as the server site;

connecting with the system site through the second cell site;

participating in the dispatch communication using the second cell site as the server site;

updating the cell site monitor list with information corresponding to the first cell site to generate an updated cell site monitor list, without benefit of new neighbor cell site information downloaded from an external source; and monitoring neighbor cell sites, using the updated cell site monitor list, to determine suitable server sites.

11. The method of claim 10, wherein the step of updating comprises the step of placing the first cell site in a priority position on the cell site monitor list.

* * * * *